United States Patent
Park et al.

(10) Patent No.: US 8,725,143 B2
(45) Date of Patent: May 13, 2014

(54) METHODS AND SYSTEMS FOR HANDOVER IN WIMAX NETWORKS

(75) Inventors: Jong Ro Park, San Ramon, CA (US); Doo Seok Kim, Pleasanton, CA (US); Jong Hyeon Park, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 665 days.

(21) Appl. No.: 12/543,423

(22) Filed: Aug. 18, 2009

(65) Prior Publication Data

US 2010/0151862 A1 Jun. 17, 2010

Related U.S. Application Data

(60) Provisional application No. 61/122,389, filed on Dec. 14, 2008.

(51) Int. Cl.
*H04W 4/00* (2009.01)

(52) U.S. Cl.
USPC .......................................... 455/434

(58) Field of Classification Search
USPC ......... 455/434, 436, 517, 437, 411, 424, 438, 455/76, 533.1, 525, 435.1, 526; 370/331, 370/332, 315, 328, 329, 395.21, 241
See application file for complete search history.

(56) References Cited

U.S. PATENT DOCUMENTS

| | | | | |
|---|---|---|---|---|
| 7,693,517 | B2 * | 4/2010 | Etemad et al. | 455/436 |
| 2004/0174845 | A1 | 9/2004 | Koo et al. | |
| 2005/0070285 | A1 * | 3/2005 | Goransson | 455/436 |
| 2005/0250499 | A1 | 11/2005 | Lee et al. | |
| 2005/0272426 | A1 * | 12/2005 | Yang et al. | 455/436 |
| 2006/0240802 | A1 * | 10/2006 | Venkitaraman et al. | 455/411 |
| 2006/0281436 | A1 | 12/2006 | Kim et al. | |
| 2007/0249355 | A1 | 10/2007 | Kang et al. | |
| 2008/0039090 | A1 * | 2/2008 | Jin et al. | 455/436 |
| 2008/0108326 | A1 | 5/2008 | Park et al. | |
| 2008/0240039 | A1 | 10/2008 | Parekh et al. | |
| 2009/0005099 | A1 * | 1/2009 | Jung et al. | 455/517 |

FOREIGN PATENT DOCUMENTS

| | | |
|---|---|---|
| KR | 20050116497 A | 12/2005 |
| KR | 20060130853 A | 12/2006 |
| WO | WO-2007111490 A1 | 10/2007 |

OTHER PUBLICATIONS

International Search Report—PCT/US2009/067211—International Search Authority, European Patent Office, Sep. 4, 2010.
Aghvami, A., et al., "Forward or backward handover for W-CDMA", G Mobile Communication Technologies, 2000. First International Conference on (Conf. Publ. No. 471), pp. 235-239.
Taiwan Search Report—TW098142536—TIPO—Jan. 14, 2013.
Taiwan Search Report—TW098142536—TIPO—Sep. 18, 2013.
Wang C.Y., "Early UL Synchronization for 802.16m Handover Process", C802.16m-08/713r1, IEEE, Jul. 11, 2008, URL, http://www.ieee802.org/16/tgm/contrib/C80216m-08_713r1.doc.
Written Opinion—PCT/US2009/067211, International Search Authority, European Patent Office Sep. 4, 2010.

* cited by examiner

*Primary Examiner* — Kiet Doan
(74) *Attorney, Agent, or Firm* — Tyler J. Overall

(57) ABSTRACT

This application provides techniques for robust handover to a target base station, based on performing initial ranging with the target base station. The techniques might generally include scanning neighboring base stations (BSs), selecting a target BS for a handover at least based on results of the scanning, performing initial ranging with the target BS, and sending a Handover Request to the target BS.

20 Claims, 9 Drawing Sheets

METHODS AND SYSTEMS FOR HANDOVER IN WIMAX NETWORKS

CLAIM OF PRIORITY

This application claims the benefit of priority from U.S. Provisional Patent Application Ser. No. 61/122,389, entitled "Robust Handover during Scanning Neighbor Base Stations in WiMAX Environments" and filed Dec. 14, 2008, which is assigned to the assignee hereof and is fully incorporated herein by reference for all purposes.

TECHNICAL FIELD

Certain embodiments of the present disclosure generally relate to wireless communications and, more particularly, to a robust handover method for transferring communication services from one base station to another.

SUMMARY

Certain embodiments provide a method for wireless communications. The method generally includes scanning neighboring base stations (BSs), selecting a target BS for a handover based on results of the scanning, performing initial ranging with the target BS, and sending a Handover Request to the target BS.

Certain embodiments provide an apparatus for wireless communications. The apparatus generally includes logic for scanning neighboring base stations (BSs), logic for selecting a target BS for a handover based on results of the scanning, logic for performing initial ranging with the target BS, and logic for sending a Handover Request to the target BS.

Certain embodiments provide an apparatus for wireless communications. The apparatus generally includes means for scanning neighboring base stations (BSs), means for selecting a target BS for a handover based on results of the scanning, means for performing initial ranging with the target BS, and means for sending a Handover Request to the target BS.

Certain embodiments provide a computer-program product for wireless communications, comprising a computer readable medium having instructions stored thereon. The instructions being executable by one or more processors and generally including instructions for scanning neighboring base stations (BSs), while being served by a serving BS, instructions for selecting a target BS for a handover, based on results of the scanning, instructions for performing initial ranging with the target BS, and instructions for performing a handover to the target BS.

Certain embodiments provide a method for wireless communications by a target base station. The method generally includes performing initial ranging with a mobile station (MS) while the MS is being served by another base station and participating in a handover procedure of the MS from the current serving BS to the target BS prior to the serving BS being notified of the handover.

Certain embodiments provide an apparatus for wireless communications by a target base station. The apparatus generally includes logic for performing initial ranging with a mobile station (MS) while the MS is being served by another base station and logic for participating in a handover procedure of the MS from the current serving BS to the target BS prior to the serving BS being notified of the handover.

Certain embodiments provide an apparatus for wireless communications by a target base station. The apparatus generally means for performing initial ranging with a mobile station (MS) while the MS is being served by another base station and means for participating in a handover procedure of the MS from the current serving BS to the target BS prior to the serving BS being notified of the handover.

Certain embodiments provide a computer-program product for wireless communications, by a target base station, comprising a computer readable medium having instructions stored thereon. The instructions being executable by one or more processors and the instructions generally including instructions for performing initial ranging with a mobile station (MS) while the MS is being served by another base station and instructions for participating in a handover procedure of the MS from the current serving BS to the target BS prior to the serving BS being notified of the handover.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
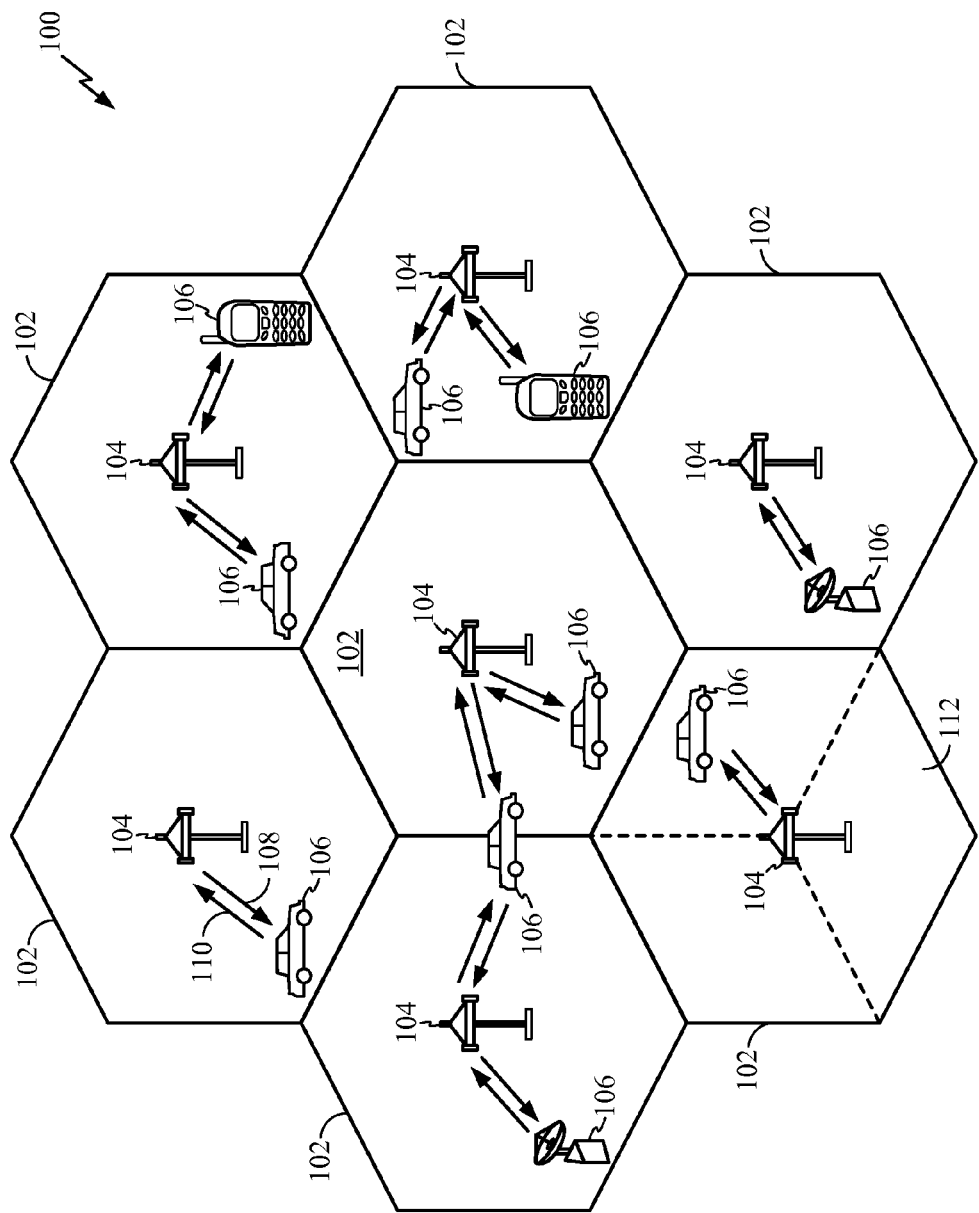
FIG. 1 illustrates an example wireless communication system, in accordance with certain embodiments of the present disclosure.

The WiMAX forum mandates a Hard Handover (HHO) that is described in the IEEE 802.16 Standard. According to the standard, the MS may request scanning intervals to a serving BS for seeking and monitoring of neighbor BSs as targets for handover (HO). Also, the serving BS may allocate time intervals. After performing scanning, the MS may report scanning results for neighbors scanned due to a previous Scanning Interval Allocation Response (MOB_SCN-RSP) message as well as due to previous autonomous scanning During HO, the MS may switch from communicating with the current serving BS to a target BS. The decision may originate at the MS, the serving BS, or on the network, based on the results of scanning or other reasons. Association is an optional initial ranging procedure occurring during the scanning interval with respect to one of the neighbor BSs. There are three levels of association as follows: Association Level 0 (Scan/Association without coordination), Association Level 1 (Association with coordination), and Association Level 2 (Network assisted association reporting).

The function of Association is to enable the MS to acquire and record ranging parameters and service availability information for the purpose of proper selection of HO target and facilitating a potential future HO to a target BS. Recorded ranging parameters of an associated BS may further be used for setting initial ranging values in future ranging events during actual HO.

Even if the MS processes Association with a target BS ahead of performing a handover, the actual HO with the target BS may still fail during HO ranging with the target BS. This is because current standard's HO procedures may involve a long delay due to multiple protocol handshakes, such as the HO message exchange between the MS and the serving BS and the information exchange between the serving BS and the target BS. The likelihood of failure in HO ranging may increase further if the MS does not process the association during the scanning interval. In either case, if the MS fails during handover with the target BS, the MS may scan neighbor BSs repeatedly to search for another candidate BS. This problem may not only cause longer delay in the overall HO procedures, but also lead to service instability in WiMAX systems.

Another problem in the current standard is that, there may be no way for the MS to inform the serving BS when the MS loses synchronization with the serving BS, after performing scanning for a potential handover. The consequence of this situation is that the MS may lose all existing service flows in which case the service flows may be reinitialized, causing further delay.

Certain embodiments of the present disclosure provide techniques for robust handover to a target base station, based on performing initial ranging with the target base station. After performing initial ranging, by sending a handover request to the target BS directly, delays due to protocol handshakes occurring in typical handover procedures may be minimized, thereby increasing the likelihood of a successful handover.

Exemplary Wireless Communication Network

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

WiMAX is one example of a communication system based on an orthogonal multiplexing scheme. As noted above, there are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
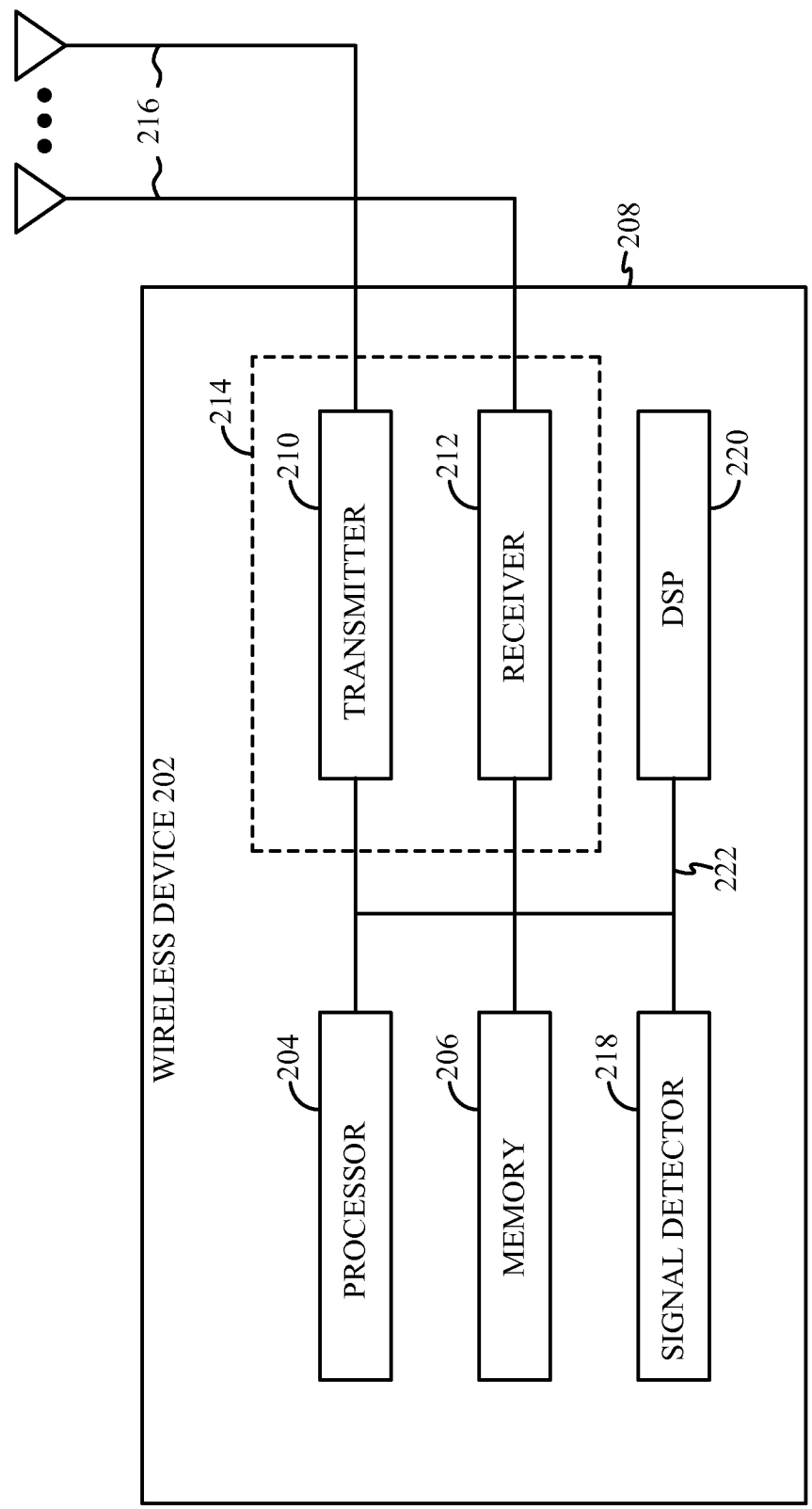
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
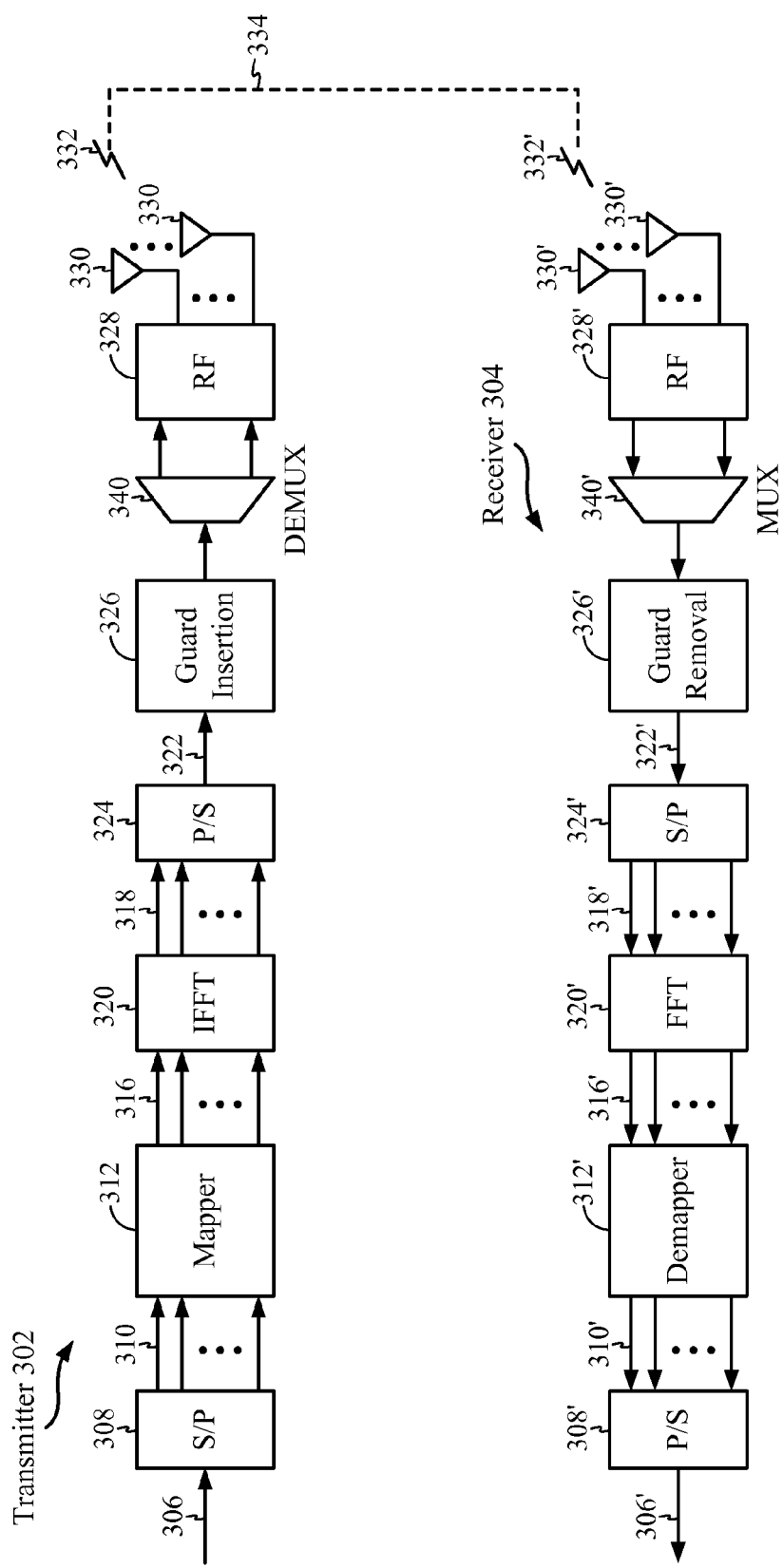
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary Handover in WiMAX Systems

Current handover (HO) procedures involve a long delay from multiple protocol handshakes between a mobile station (MS) and a serving base station (BS) and information exchange between the serving BS and a target BS. As a result, handover with the target BS may fail, even if the MS performed an initial ranging with the target BS, ahead of the handover.

Figure 4:
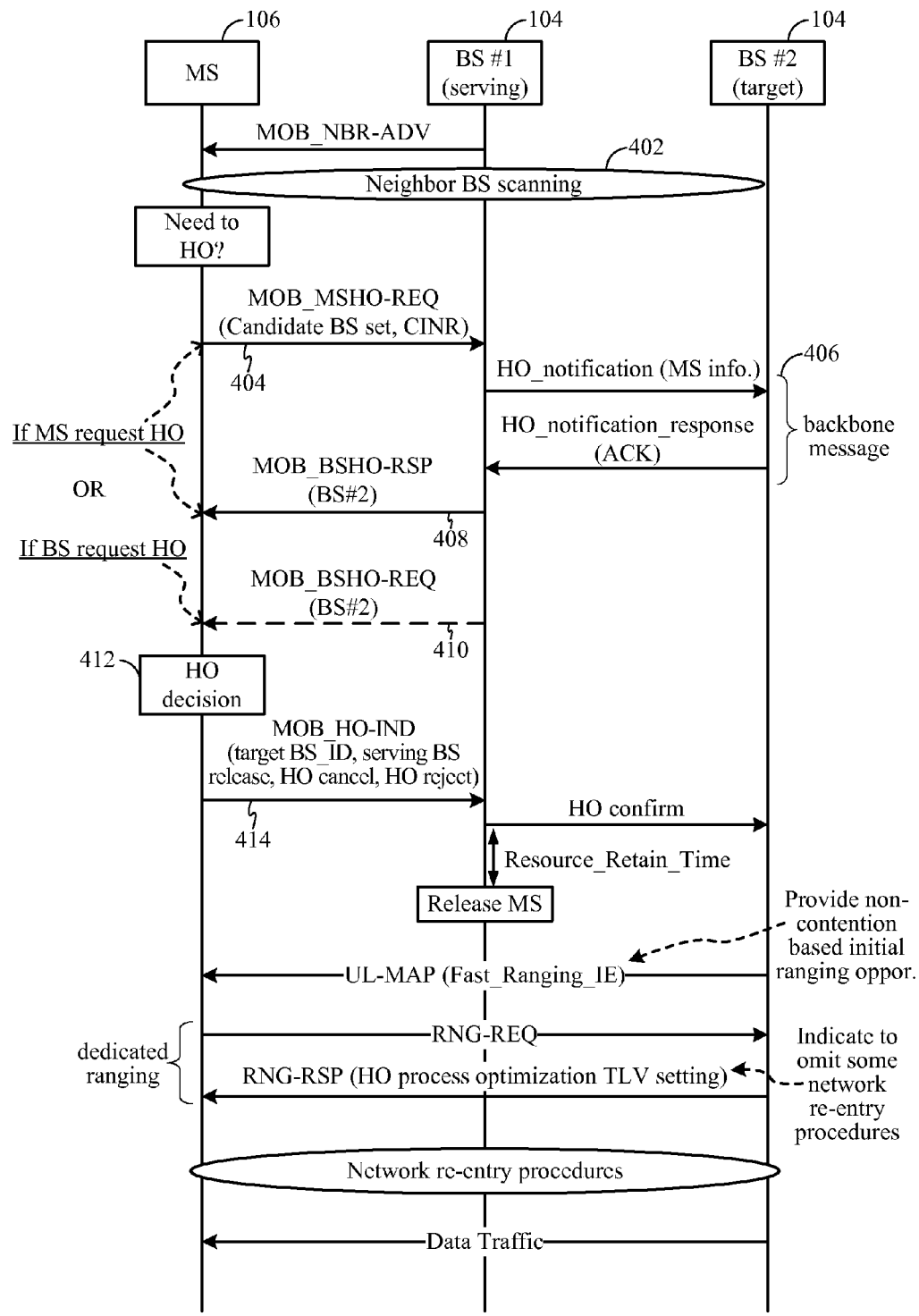
FIG. 4 illustrates a typical handover in a wireless communication system shown in FIG. 1, in accordance with certain embodiments of the present disclosure.

FIG. 4 illustrates a typical HO procedure for an MS 106 from a current serving BS 104 (BS #1) to a target BS 104 (BS #2). Serving BS (BS #1) may periodically send a Mobile Neighbor Advertisement (MOB_NBR-ADV) message to MS 106. The MOB_NBR-ADV may contain information about current network topology including information about one or more neighbor BSs. At 402, the MS may scan the neighbor BSs using the information contained in the MOB_NBR-ADV message. The scan may help the MS collect information such as link quality parameters associated with the neighbor BSs. Using results of the scan, the MS may determine whether handover is desirable and if so, which of the neighbor BSs will be a suitable target for the handover. As described earlier, association is an optional initial ranging procedure that may help the MS acquire power adjustments, timing adjustments etc. that the MS may use during actual handover.

If the MS desires handover, the MS may send a MS Handover Request (MOB_MSHO-REQ) message to BS #1 at 404. The MOB_MSHO-REQ message may contain a list of one or more target BS candidates (e.g., BS #2) and also results of the scan. After receiving the MOB_MSHO-REQ message, BS #1 may send a Handover Notification (HO_notification) message containing information about the MS, to BS #2. Based on the HO_notification message and/or additionally gathered information about the MS, BS #2 may determine whether to support the handover and notify BS #1 via a Handover Notification Response (HO_notification_response) message.

As illustrated, these message exchanges between BS #1 and BS #2 may occur over the network backbone at 406. After receiving the HO_notification_response message, BS #1 may inform the MS about the decision of BS #2 (now the target BS) via a BS Handover Response (MOB_BSHO-RSP) message at 408.

It is also possible that BS #1 (the serving BS) may initiate handover of the MS. In such a case BS #1 may send to the MS, a BS Handover Request (MOB_BSHO-REQ) message containing a list of one or more target BS candidates (e.g., BS #2) at 410. The MS, on receiving the MOB_BSHO-REQ message may scan the candidate BSs in an effort to determine suitability for handover.

At 412, the MS may decide whether to proceed with the handover. Following this, the MS may send a Mobile Handover Indication (MOB_HO-IND) message indicating the MS's decision at 414. A "serving BS release" option in the MOB_HO-IND message may confirm the MS's desire for handover. The MOB_HO-IND message may further contain a target Base Station Identifier (BSID) field indicating the target BS (i.e., BS #2). After receiving handover confirmation from the MS, BS #1 may relay the confirmation to the target BS and then release the MS.

The MS may then perform non-contention based ranging with BS #2 for adjustment of timing, power, etc. The ranging may be performed using a dedicated ranging opportunity provided by BS #2 via a fast ranging information element (Fast_Ranging_IE) placed in an Uplink map (UL-MAP) message. If association with BS #2 was previously performed during scanning, the non-contention based ranging may be expedited. The MS may then indicate to BS #2 that the MS likes to reenter the network, via a Ranging Request (RNG-REQ) message. BS #2 may respond to the RNG-REQ message by sending to the MS, a Ranging Response (RNG-RSP) message with a handover (HO) process optimization field containing information about one or more steps that the MS may skip while performing network reentry. This may make network reentry easier for the MS. The MS may then reenter the network causing data transfer between the MS and BS #2.

The HO procedure shown in FIG. 4 may be a lengthy process involving many frames. For example, in the illustrated example, there may be at least 14 OFDM(A) frames involved, starting from neighbor BS scanning till switching to the target BS. If one frame is 5 ms long, the total delay involved may be 70 ms. This delay may increase according to the number of neighbor BSs scanned and the scanning interval.

Further, the total delay increase further in certain channel environments due to changing conditions in these channel environments. As a result, ranging parameters of an associated BS may become outdated and therefore may not be useful for setting initial ranging values in future ranging events during actual HO to the BS.

According to certain embodiments of the present disclosure, an MS, on successful completion of initial ranging may send a handover request directly to a target BS instead of to the current serving BS. Doing so may reduce the delays pertaining to protocol handshakes between the MS and the serving BS occurring before handover.

Exemplary Robust Handover during Scanning Neighbor BSs in WiMAX Systems

Figure 5:
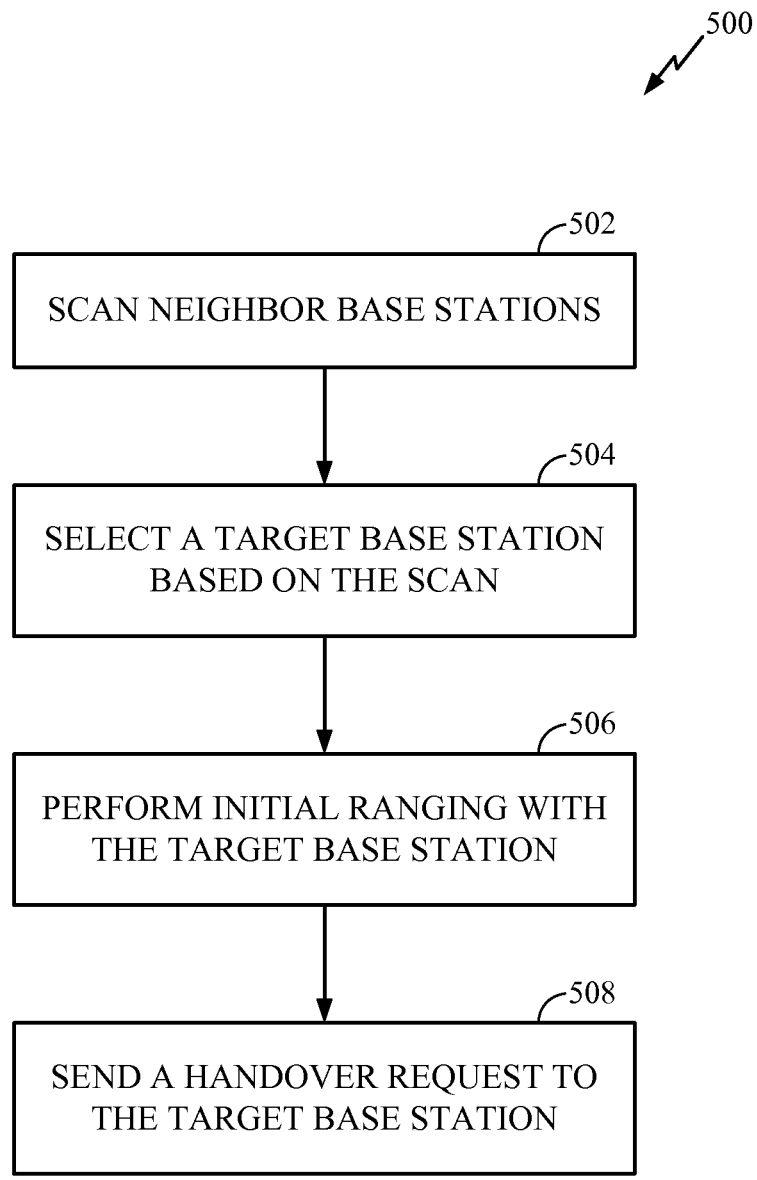
FIG. 5 illustrates example operations for performing a handover to a target base station (BS), in accordance with certain embodiments of the present disclosure.

FIG. 5 illustrates example operations 500 for performing a robust handover procedure, according to certain embodiments of the present disclosure. The operations 500 may be performed by a MS such as the MS 106 illustrated in FIG. 4.

The operations 500 may begin at 502, with the MS scanning one or more neighbor BSs. The scan may be triggered by a message, such as the MOB_NBR-ADV message shown in FIG. 4, sent by the serving BS. Parameters related to the scan such as scanning interval, type of scan, etc. may be determined by the serving BS. In certain embodiments, the scan may simply be an autonomous scan performed by the MS. The purpose of the scan may be to identify a target BS for handover.

At 504, the MS may select a target BS for handover, based on results of the scan. A suitable technique may be used to determine the target BS. For instance, the MS may select a BS as the target based on whether CINR value of the BS is higher than the CINR value of the serving BS. In certain embodiments, a combination of metrics may be used to select the target BS.

At 506, the MS may perform initial ranging with the target BS. The ranging procedure may be performed until the ranging is successful as indicated by the target BS. As described earlier, the ranging procedure may help the MS acquire and record ranging parameters and service availability of the target BS. Information thus acquired may help the MS determine whether handover to the target BS is suitable and if so, expedite the handover.

At 508, the MS may send a handover request to the target BS. It may be noted that sending a handover request to the target BS directly is in contrast with a typical handover procedure in which the handover request is sent to the serving BS. Sending the handover request to the target BS directly may avoid delays due to handshaking between the MS and the serving BS and other delays as shown in FIG. 4. As a result, changes in channel conditions may not be significant enough to outdate the ranging parameters collected during the initial ranging, thereby allowing the use of these ranging parameters during handover to the target BS.

Figure 6:
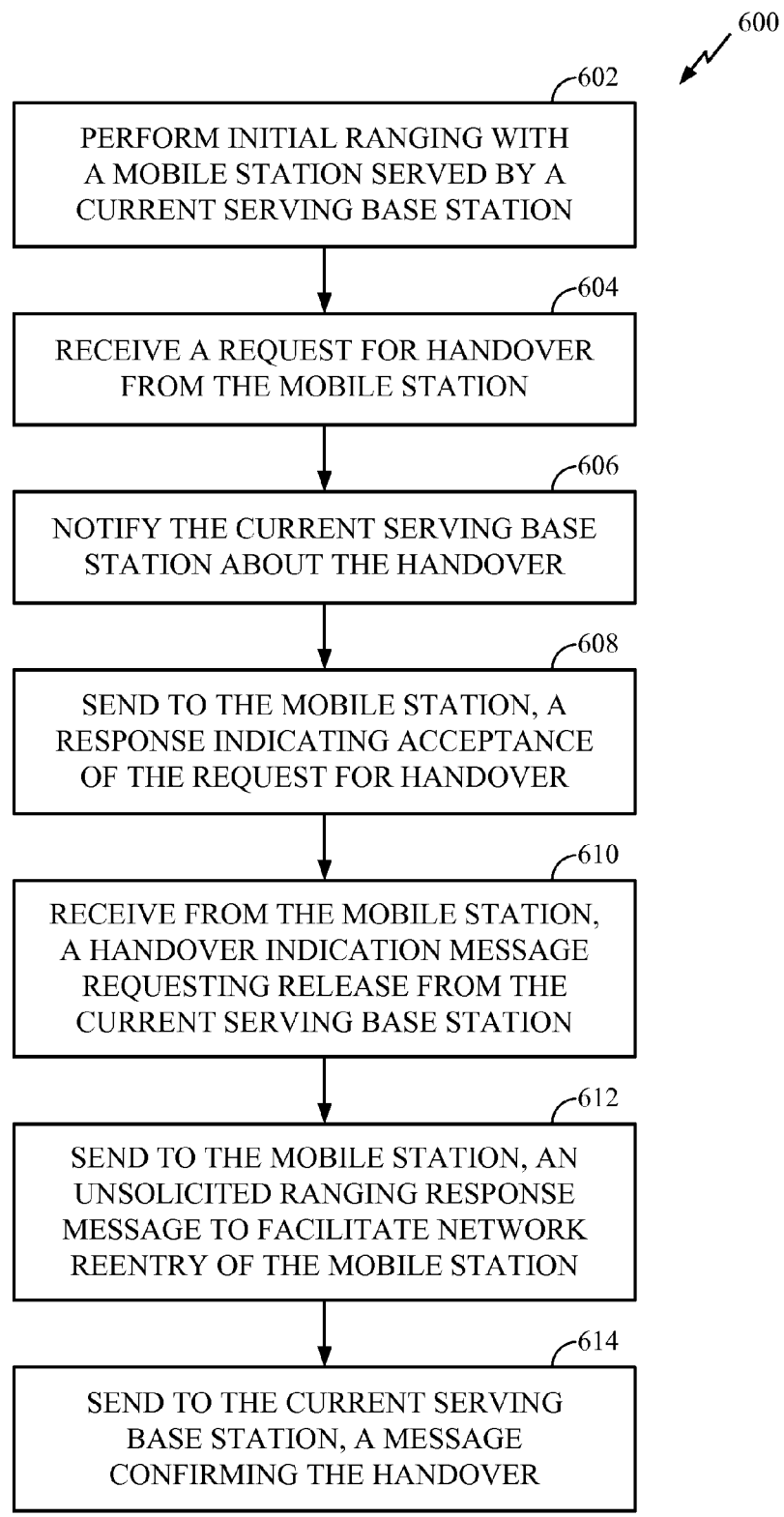
FIG. 6 illustrates a flow diagram of example operations performed by a target BS, in accordance with certain embodiments of the present disclosure.

FIG. 6 illustrates example operations 600, for example, that may be performed by a target BS. As described above, the target BS may be chosen by the MS for handover, based on scan results.

The operations 600 may begin at 602 with the target BS performing initial ranging with a MS currently served by another BS, thereby facilitating acquisition of ranging parameters by the MS. As described earlier, the MS may make a handover decision and send a handover request to the target BS directly. At 604, the target BS may receive the handover request.

At 606, the target BS may notify the current serving BS (i.e., the BS currently serving the MS) about the handover via the network backbone. To accomplish this, the target BS may use a HO_notification message. It may be noted that, unlike typical handover procedures, in certain embodiments of the present disclosure, the target BS may be configured to send the serving BS messages such as the HO_notification message in order to communicate information about the handover, and the serving BS may be configured to respond to such messages.

At 608, the target BS may send a response to the MS, indicating acceptance of the handover request that the target BS received at 604. The MS may then make a decision regarding the handover and notify the target BS via a handover indication message. The handover indication message may further act as a request from the MS, to be released from the current serving BS.

At 610, the target BS may receive the handover indication message sent by the MS. At 612, the target BS may then send to the MS, an unsolicited ranging response message containing information that the MS may use to perform an expedited network reentry. To accomplish this, the target BS may acquire information about the MS from the current serving BS and, based on the information, generate a HO process optimization Type Length Value (TLV) setting to be included in the ranging response message. Information about the MS may be acquired via the network backbone. Sending the ranging response message in an unsolicited manner may expedite the handover since the target BS does not wait for the MS to acquire a ranging opportunity and then send a ranging request message requesting network reentry if the MS has more information to provide the target BS, as the target BS does not get any new or changed information from current serving BS. If there is not any new information, the MS may send any data for network re-entry whenever the target BS allocates an interval for the MS.

At 614, the target BS may send a message confirming the handover, to the current serving BS. After receiving the confirmation, the current serving BS may release the MS so that the MS may be served by the target BS.

Figure 7:
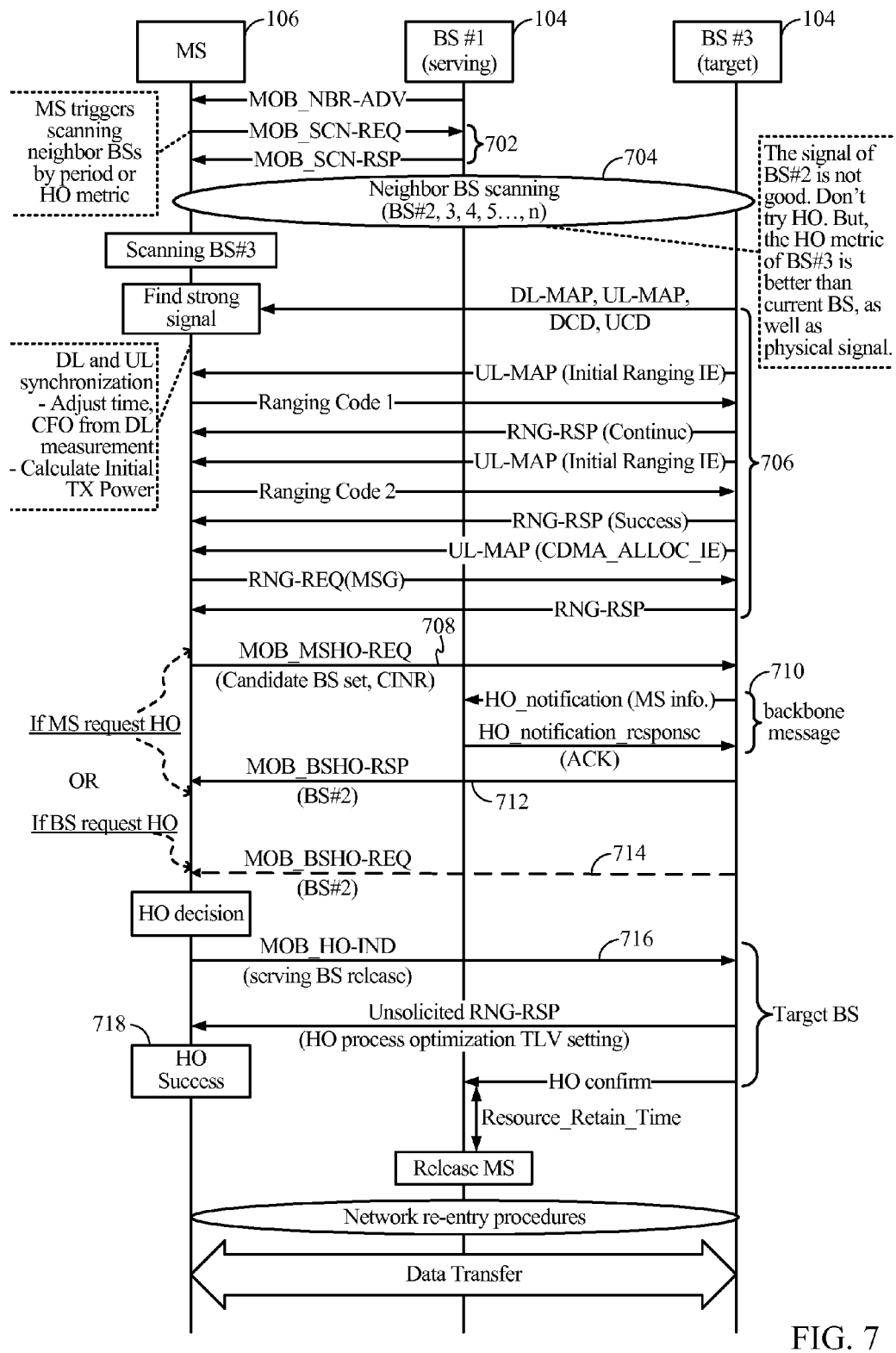
FIG. 7 illustrates a call flow of example operations for performing a handover to a target BS, in accordance with certain embodiments of the present disclosure.

FIG. 7 illustrates a call flow of example operations for performing a handover to a target BS. After receiving information about one or more neighbor BSs via a MOB_NBR-ADV message, the MS, at 702, may send to BS #1 (serving BS), a Scanning Interval Allocation Request (MOB_SCN-REQ) message requesting information that may be useful in scanning the neighbor BSs to identify a target BS. BS #1 may respond to the MOB_SCN-REQ message by sending a Scanning Interval Allocation Response (MOB_SCN-RSP) message. MOB_SCN-RSP message may contain information such as scan duration, type of scanning, etc.

At 704, the MS may scan the neighbor BSs (BSs #2 through #n). The MS may select BS #3 as a target, based on whether BS #3 is better than current serving BS (BS #1) in terms of measured signal strength, for instance. The MS may continue scanning BS #3 for synchronization purposes.

At 706, the MS may perform contention-based initial ranging with BS #3 (the target BS). The MS may first perform downlink (DL) and/or uplink (UL) synchronization with BS #3 using Downlink map (DL-MAP) and Uplink map (UL-MAP) messages sent by BS #3. The MS may then look for initial ranging opportunities by scanning UL-MAP messages. Following this, the MS may send a randomly selected ranging code (e.g., Ranging Code 1). Based on the ranging code, BS #3 may send adjustments for timing, power, etc. via a Ranging Response (RNG-RSP) message. The MS may then send a new ranging code, such as Ranging Code 2, with corrected timing, power, etc. The process may be repeated until the ranging is successful as indicated by BS #3. Following initial ranging, the MS may request handover by sending a MS Handover Request (MOB_MSHO-REQ) message to BS #3 at 708.

At 710, BS #3 may notify BS #1 about the handover via the network backbone by sending a Handover Notification (HO_notification) message containing information about the MS. BS #1 may acknowledge the HO_notification message by sending a Handover Notification Response (HO_notification_response) to the target BS. At 712, BS #3 may indicate acceptance of the handover request by sending a BS Handover Response (MOB_BSHO-RSP) message.

According to certain embodiments of the present disclosure, the target BS may be configured to request a handover by sending a BS Handover Request (MOB_BSHO-REQ) message to the MS at 714. The target BS may determine whether handover may be suitable based on the initial ranging procedure.

At 716, the MS may send a Mobile Handover Indication (MOB_HO-IND) message to BS #3 for a final indication that the MS is about to perform a handover and to indicate that the MS likes to be released from the serving BS (BS #1).

After receiving the MOB_HO-IND message, BS #3 may send an unsolicited Ranging Response (RNG-RSP) message to the MS, at 718. The RNG-RSP message may contain HO process optimization information to facilitate network reentry as described earlier. If desired, BS #3 may also include timing adjustments, power adjustments etc. in the RNG-RSP message. BS #3 may then send a handover confirmation (HO confirm) message to BS #1 following which the MS is released by BS #1. The MS may then reenter the network resulting in data traffic with BS #3.

According to certain embodiments of the present disclosure, because communication between the MS and the serving BS may be minimized after scanning neighbor base stations, the chance of losing synchronization with the serving BS may be reduced, relative to conventional techniques. Even the task of notifying the BS about the handover may be handled by the target BS over the network backbone, as described above.

Thus, according to certain techniques presented herein, by selecting a new serving BS during scanning intervals and communicating directly with the selected target BS, the MS may perform a more robust handover procedure when compared to conventional handover techniques.

Figure 5A:
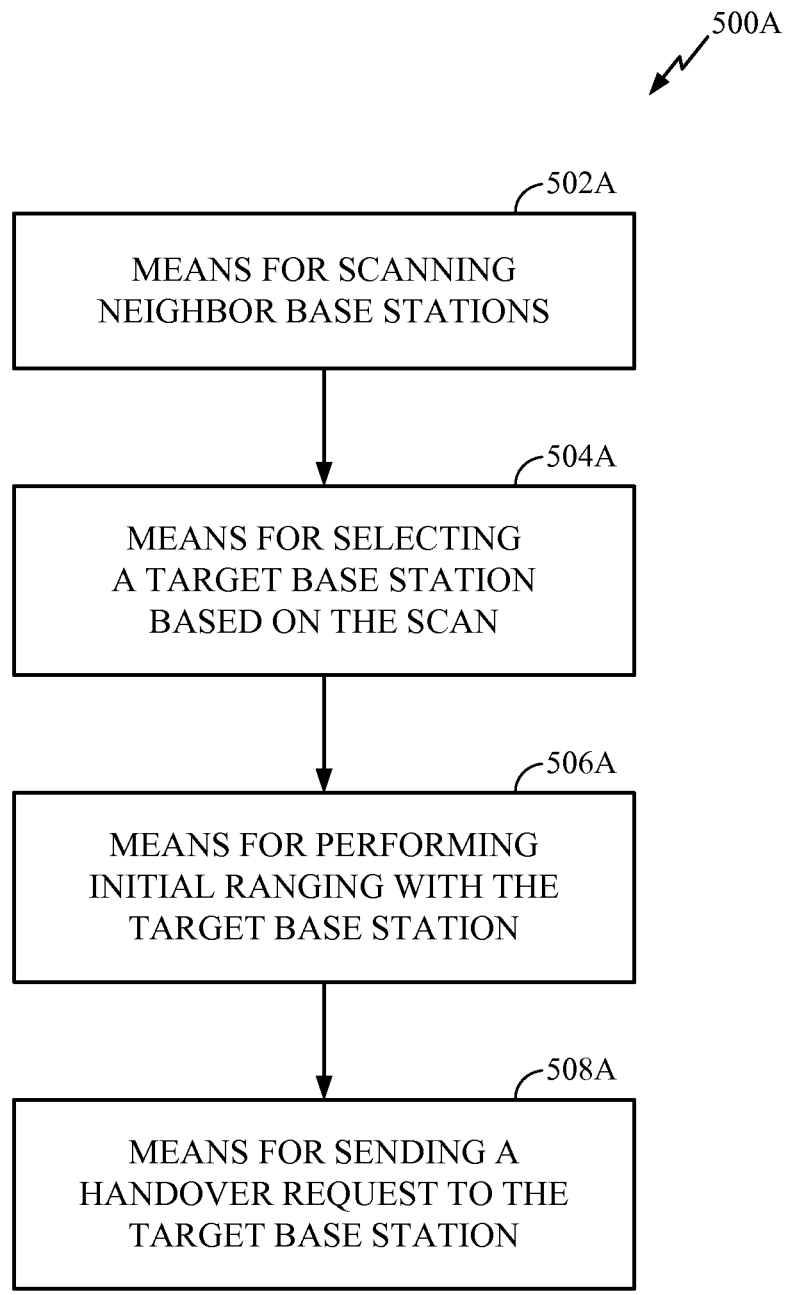
FIG. 5A is a block diagram of means corresponding to the example operations of FIG. 5, in accordance with certain embodiments of the present disclosure.
Figure 6A:
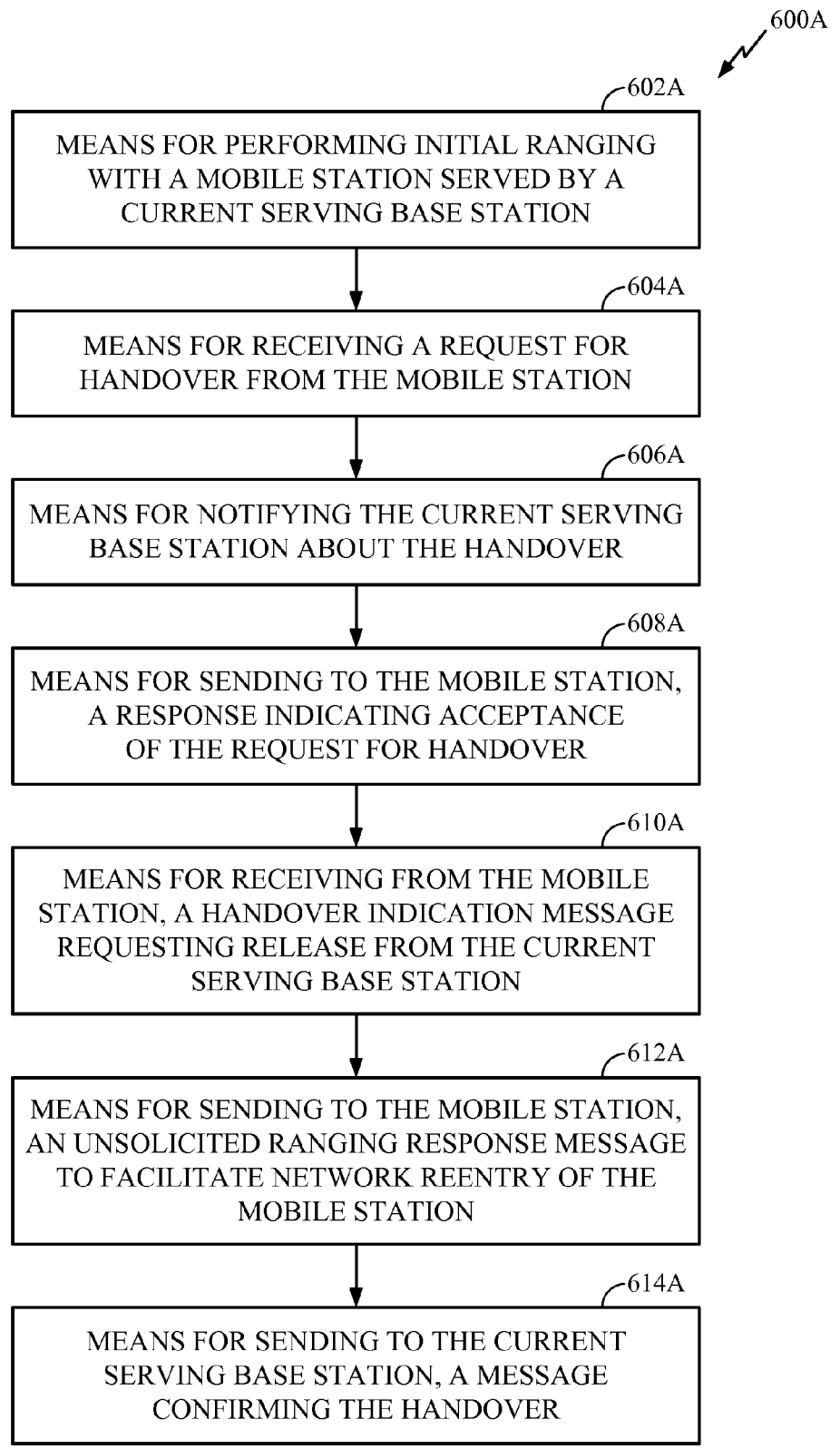
FIG. 6A is a block diagram of means corresponding to the example operations of FIG. 6, in accordance with certain embodiments of the present disclosure.

The various operations of the method described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, operations 502-508 and 602-614 illustrated in FIGS. 5 and 6 correspond to means-plus-function blocks 502A-508A and 602A-614A illustrated in FIGS. 5A and 6A.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to embodiments of the present disclosure, other and further embodiments of the disclosure may be devised without departing from the basic scope thereof, and the scope thereof is determined by the claims that follow.

What is claimed is:

1. A method for wireless communications by a mobile station (MS), comprising:
scanning neighboring base stations (BSs), while being served by a serving BS;
selecting a target BS for a handover, based on results of the scanning;
performing initial ranging with the target BS; and
performing a handover to the target BS, wherein a handover request is transmitted between the MS and the target BS after performing the initial ranging and prior to a transmission notifying the serving BS of the handover.

2. The method of claim 1, further comprising:
receiving confirmation from the target BS; and
releasing connections with the serving BS.

3. The method of claim 1, wherein scanning neighboring base stations comprises scanning with association.

4. The method of claim 1, wherein performing the handover to the target BS comprises receiving the handover request from the target BS.

5. The method of claim 1, wherein performing the handover to the target BS comprises sending the handover request to the target BS.

6. An apparatus for wireless communications, comprising:
a processor;
memory in electronic communication with the processor; and
instructions stored in the memory and executable by the processor to:
scan neighboring base stations (BSs), while being served by a serving BS;
select a target BS for a handover, based on results of the scanning;
perform initial ranging with the target BS; and
perform a handover to the target BS, wherein a handover request is transmitted between the apparatus and the target BS after performing the initial ranging and prior to a transmission notifying the serving BS of the handover.

7. The method of claim 6, wherein the instructions are executable by the processor to:
receive confirmation from the target BS; and
release connections with the serving BS.

8. The apparatus of claim 6, wherein the instructions are executable by the processor to scan with association the neighboring BSs.

9. The apparatus of claim 6, wherein the instructions are executable by the processor to receive the handover request from the target BS.

10. The apparatus of claim 6, wherein the instructions are executable by the processor to send the handover request to the target BS.

11. An apparatus for wireless communications, comprising:
means for scanning neighboring base stations (BSs), while being served by a serving BS;
means for selecting a target BS for a handover, based on results of the scanning;

means for performing initial ranging with the target BS; and means for performing a handover to the target BS, wherein a handover request is transmitted between the apparatus and the target BS after performing the initial ranging and prior to a transmission notifying the serving BS of the handover.

12. The apparatus of claim 11, further comprising:

means for receiving confirmation from the target BS; and means for releasing connections with the serving BS.

13. The apparatus of claim 11, wherein the means for scanning neighboring base stations comprises means for scanning with association.

14. The apparatus of claim 11, wherein the means for performing the handover to the target BS comprises means for receiving the handover request from the target BS.

15. The apparatus of claim 11, wherein the means for performing the handover to the target BS comprises means for sending the handover request to the target BS.

16. A computer-program product for wireless communications by a mobile station (MS), comprising a non-transitory computer readable medium having instructions stored thereon, the instructions being executable by one or more processors and the instructions comprising:

instructions for scanning neighboring base stations (BSs), while being served by a serving BS;

instructions for selecting a target BS for a handover, based on results of the scanning;

instructions for performing initial ranging with the target BS; and instructions for performing a handover to the target BS, wherein a handover request is transmitted between the apparatus and the target BS after performing the initial ranging and prior to a transmission notifying the serving BS of the handover.

17. The computer-program product of claim 16, wherein the instructions further comprise:

instructions for receiving confirmation from the target BS; and instructions for releasing connections with the serving BS.

18. The computer-program product of claim 16, wherein the instructions for scanning neighboring base stations comprise instructions for scanning with association.

19. The computer-program product of claim 16, wherein the instructions for performing the handover to the target BS comprise instructions for receiving the handover request from the target BS.

20. The computer-program product of claim 16, wherein the instructions for performing the handover to the target BS comprise instructions for sending the handover request to the target BS.

* * * * *